United States Patent
DeLuca et al.

[11] Patent Number: 5,448,756
[45] Date of Patent: Sep. 5, 1995

[54] HIGH FREQUENCY BATTERY SAVER FOR A RADIO RECEIVER

[75] Inventors: Michael J. DeLuca; Tuan K. Nguyen, both of Boca Raton, Fla.

[73] Assignee: Motorola, Inc., Schaumburg, Ill.

[21] Appl. No.: 908,672

[22] Filed: Jul. 2, 1992

[51] Int. Cl.6 .......................................... H04B 1/16
[52] U.S. Cl. ................................. 455/38.3; 455/343
[58] Field of Search ................ 455/38.3, 220, 222, 455/223, 231, 228, 343; 340/825.44; 375/317, 318, 319, 362

[56] References Cited

U.S. PATENT DOCUMENTS

| | | | |
|---|---|---|---|
| 4,188,585 | 2/1980 | Wissel et al. | 455/343 |
| 4,631,496 | 12/1986 | Borras et al. | 331/14 X |
| 4,811,362 | 3/1989 | Yester, Jr. et al. | 455/343 X |
| 4,995,099 | 2/1991 | Davis | 455/343 |
| 4,996,526 | 2/1991 | DeLuca | 340/825.44 |
| 5,152,006 | 9/1992 | Klaus | 655/343 X |
| 5,193,211 | 3/1993 | Nobusawa | 455/343 X |
| 5,193,212 | 3/1993 | Son | 455/38.3 |
| 5,241,568 | 8/1993 | Fernandez et al. | 455/343 X |

*Primary Examiner*—Edward F. Urban
*Attorney, Agent, or Firm*—D. Andrew Floam; Michael J. DeLuca

[57] ABSTRACT

A radio receiver receives information on a radio carrier and switches portions of the receiver (12, 14, 18) OFF and ON at a rate greater than the bandwidth of the information, thereby reducing the power consumed by the radio receiver. A signal quality detector (42) determines the amount of distortion introduced by the switching and controls a duty cycle modulator (44) in order to maximize the OFF time while maintaining adequate signal quality. If receiving a data transmission, a synchronizer (46) may be used to synchronize the switching to the bit timing. A transmission gate (24) and capacitor (26) holds the input of filter (32) constant while portions of the receiver are OFF or generating transients due to being switched ON.

14 Claims, 5 Drawing Sheets

HIGH FREQUENCY BATTERY SAVER FOR A RADIO RECEIVER

FIELD OF THE INVENTION

This invention relates generally to power conservation within a receiving means while receiving information. More specifically, this invention relates to a method and apparatus of switching portions of the receiving means between high and low power states at rates greater than the bandwidth of the received information while maintaining the integrity of the received information.

BACKGROUND OF THE INVENTION

Reduction of power consumption in portable receivers, such as pagers, has long been desirable ends because of resulting increase in battery life makes such improved receivers more marketable. In the past, numerous methods of reducing power consumption have been described. Most of the methods deal with either reducing the operating power of the receiver while receiving information with circuits which operate at either reduced voltage or current, or switching the receiver OFF when unnecessary information for a particular receiver is being transmitted.

However, methods of the latter type generally do not provide for reduced power consumption when information for the receiver is being transmitted because the receiver must remain ON in order to receive the information. Also, methods of the former type generally do not account for the common situation where the transmitted power is substantially greater than the minimum power necessary for proper reception of the information. Although automatic gain control (AGC) circuits have been described which may reduce receiver power consumption under strong signal environments, these analog circuits add complexity to the design of the receiver, are often limited to conserving power in a single amplifier section of a receiver, and make design of the entire receiver system under worse case conditions more complex because of the dynamics of gain variation.

Furthermore, modern pagers expend more power receiving longer messages. Modern pagers such as alpha-numeric pagers have substantially increased message storage memory and receive mail drop information which is continually updated, such as stock market prices or sports scores and statistics. Thus, more power is consumed in the reception of more and longer messages than the prior short message tone only or numeric pagers.

Thus what is needed is an improved method and apparatus capable of reducing the power consumption of a receiver while receiving information. The improvement should be simple to implement, thereby simplifying receiver design, and the improvement should be capable of reducing power consumed not only by a single amplifier, but by multiple amplifiers and other circuits in the receiving means such as mixers or frequency injection sources such as oscillators or synthesizers, without adding additional circuit complexity.

SUMMARY OF THE INVENTION

In accordance with the present invention, a method conserves power in a receiver receiving information having a bandwidth. The method comprises the step of switching at least a portion of the receiver between a high and a low power state at a rate greater than the bandwidth of the information while receiving the information.

In accordance with the present invention, a method of conserving power in a receiver receiving a radio frequency signal having digital information contained within symbols comprises the steps of operating the receiver in a high power mode in order to receive and process the radio frequency signal for a first portion of a symbol; and operating at least a portion of the receiver in a low power mode for a second portion of the symbol, the low power mode rendering reception of the radio frequency signal substantially inoperative during the second portion of the symbol.

In further accordance with the present invention, an apparatus for processing information having a bandwidth and being modulated upon a carrier signal comprises: a receiving means for receiving the carrier signal and demodulating the information while in a high power state; and, a power conservation means coupled to said receiving means for switching at least a portion of said receiving means between the high power state and a lower power state at a rate greater than the bandwidth of the information.

DETAILED DESCRIPTION OF THE INVENTION

Figure 1:
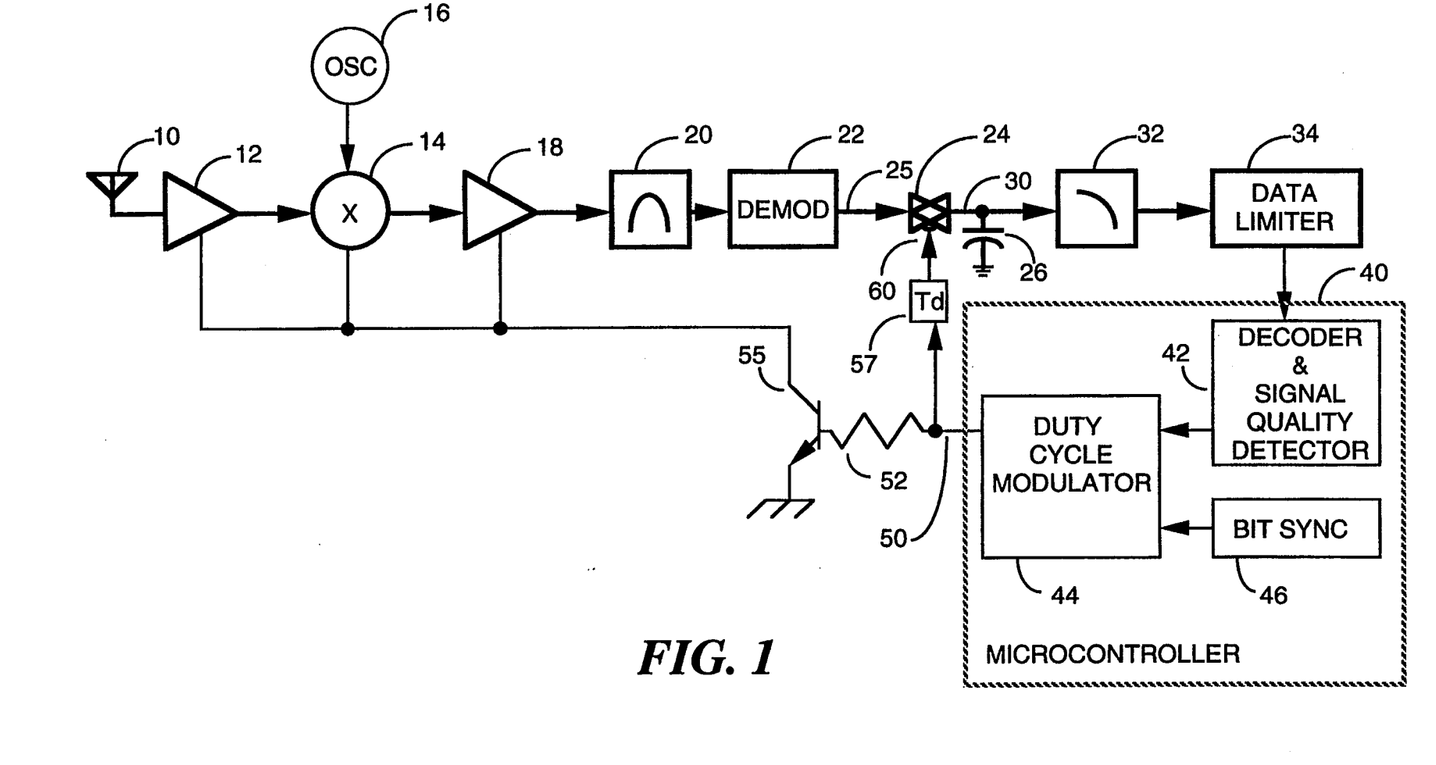
FIG. 1 shows a pager block diagram in accordance with a preferred embodiment of the present invention.

FIG. 1 shows a pager block diagram of a preferred embodiment of the present invention. Radio frequency signals having a paging protocol (such as POCSAG, GSC, or tone and voice) modulated thereon are received by antenna 10, amplified by RF amplifier 12 which may also include some filtering circuity, mixed down to an intermediate frequency by mixer 14 and local oscillator 16 which may be either a crystal oscillator or a synthesizer. The intermediate frequency is amplified and filtered by amplifier 18 and filter 20 which provide a block of channel selectivity. Filter 20 may be a typical 455 kHz crystal filter having a bandwidth of 25 kHz. The paging information is then demodulated from the intermediate frequency by demodulator 22, The output being shown at node 25. The paging information on node 25 is passed to node 30 by transmission gate 24 when enabled, otherwise, a voltage is held on capacitor 26 when transmission gate 24 is disabled. The combination of enabled and disabled modes of gate 24 modes produce a recovered information signal at node 30. The recovered information signal 30 is filtered by low pass filter 32 which has a bandwidth optimized to pass the information received. For example if 1200 BPS POC- SAG is being received, the bandwidth of the data and filter 32 may be somewhat greater than 600 Hz. The filtered information is limited by data limiter 34 which produces a stream of binary information for processing by microcontroller 40. Microcontroller 40 processes the information in a method well known to those familiar in the art. If an address matching an address of the pager is received, an alert may be generated and subsequent message information received.

The quality of the received information is then determined by quality detector 42, which may be integral to the decoding process. The quality of the signal is indicative of the power of the received radio frequency signal at the antenna plus distortions introduced by the receiving process. In general, a high quality signal is indicative of a receiver being close to a transmitter, while distortions in the signal introduced either by noise as a result of the receiver being far away from the transmitter, or distortions generated by the receiver are indicative of a low quality signal. Numerous methods have been described for determining the quality of a received signal. The preferred method is monitoring the phase noise of the data transitions in order to determine the presence of a predetermined baud rate. Such a method is shown in U.S Pat. No. 5,077,758 to DeLuca et al. entitled "Signal Detector and Bit Synchronizer", which is hereby incorporated by reference. By this method, all data edges which occur within a predetermined window in time indicates a high quality signal. The window exists for a portion of a bit. Otherwise, one or more edges occurring outside of the predetermined window indicates a low quality signal. An alternate method includes monitoring the number of bit corrections in a 32, 21 BCH POCSAG data word. Zero bit corrections indicating high quality information, while one or more bit errors indicating low quality information. In alternate embodiments, methods for determining the quality of analog information (such as tone or voice information) include common squelch methods such as monitoring the IF rise or monitoring the energy in frequencies beyond the audio range.

Quality detector 42 is coupled to duty cycle modulator 44 which produces a battery save signal 50 for conserving receiver power while the decoder is processing received information. In one embodiment, duty cycle modulator 44 may also be coupled to bit synchronizer 46 for battery saving operation synchronous with the received data. Battery save signal 50 causes the power consumed by portions of the receiver to be reduced by switching those portions between low and high power modes in response to the quality detector. In a preferred embodiment amplifiers 12 and 18, and mixer 14 are switched OFF (low power mode) and ON (high power mode) by providing ground to the devices through transistor 55, which is coupled through resistor 52 to battery save signal 50. Since amplifiers 12 and 18 and mixer 14 are all high frequency devices relative to the bandwidth of the received information, they may be switched ON and OFF at rates substantially greater than the bandwidth of the received information. If the rate of switching is greater than bandwidth of a filter section, such as IF filter 20 and/or data filter 32, then the distortion to the signal while devices 12, 14, and 18 are OFF will generally be filtered out by either or both of the filter sections. Additionally, transmission gate 24 serves to block start-up transients when devices 12, 14, and 18 are either OFF or stabilizing after being switched ON. Capacitor 26 also holds the prior demodulated voltage while devices 12, 14, and 18 are either OFF or stabilizing after being switched ON. Delay 57, in response to battery save signal 50 produces a transmission gate control signal at node 60, and acts to block start-up transients on node 25 from the recovered information signal 30 resulting from devices 12, 14, and 18 when switched back ON in response to battery save signal 50.

Switching devices OFF and ON, such as devices 12, 14, and 18, to conserve power is a relatively simple method of conserving power while receiving message information. Once the algorithm is implemented in the computer 40, the current drain of a number of receiver circuits may be reduced by this signal. Alternate embodiments need not be limited to switching devices 12, 14, an 18. In the preferred embodiment RF amplifier 12 and mixer 14 have stabilization time much less than 1 $\mu$S, while the IF amp 18 may have a stabilization time of substantially 5 $\mu$S, both of which are much less than the 833 $\mu$S bit time of a 1200 BAUD POCSAG bit. Thus, these devices may be switched OFF and ON multiple times within a bit time. Also, any of devices 12, 14 or 18 may be removed from battery saving switching in certain applications, for example the lower frequency IF amp 18 may be removed for even faster stabilization time. Other devices may be added to the battery saving switching such as oscillator 16 which may be switched between a normal high power oscillation state and a lower power oscillation maintenance state. Similar switching may occur in other receiver circuits, such as demodulator 22, while remaining within the scope of the invention. Alternately, the devices need not be switched OFF, but may be switched into a lower power state which may decrease the stabilization time of the device when powered back a normal high power state.

Figure 2:
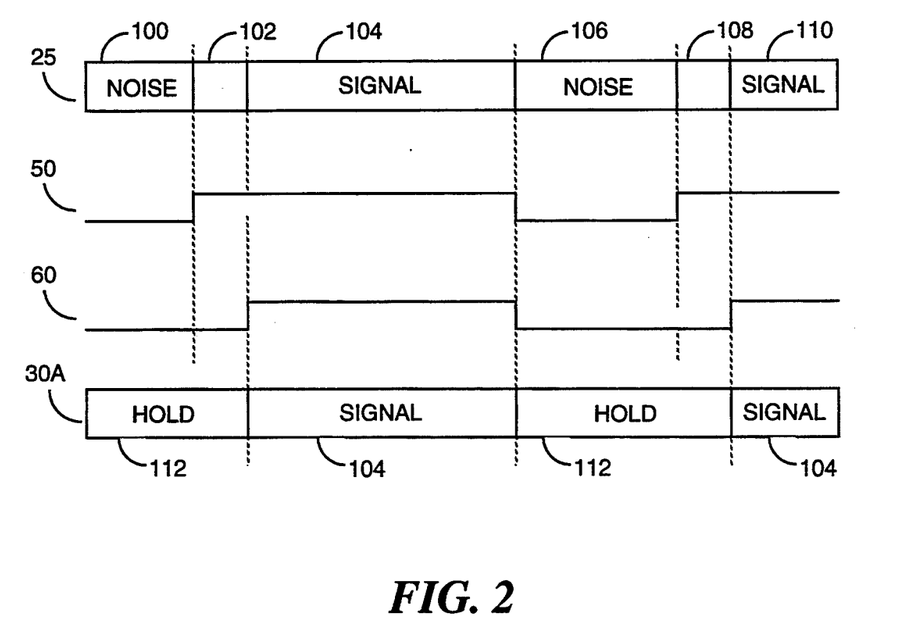
FIG. 2 diagrams the recovered information signal in accordance with the preferred embodiment of the present invention.

FIG. 2 diagrams the recovered information signal. Line 25 of FIG. 2 represents the received signal on node 25 of FIG. 1. Line 30A of FIG. 2 represents the signal present on the recovered information signal of node 30 of FIG. 1, in response to battery saving signals on nodes 50 and 60 as shown by lines 50 and 60 respectively of FIG. 2. During interval 100, battery saver 50 is low causing devices 12, 14, and 18 to be in a low power state, thus signal is not properly received and noise is present on node 25. Transmission gate control signal is also low causing the signal on line 30A to be the voltage stored upon capacitor 26 as indicated by HOLD state 112. During interval 102, battery saver 50 goes high causing devices 12, 14, and 18 to go through a start-up transient condition as indicated by the hashed area 102 of line 25. After a delay, devices 12, 14, and 18 are stable and operating correctly, as shown by the SIGNAL area 104 of line 25. Line 60 goes high switching line 30A from a HOLD state 112 to a SIGNAL state 104. At the end of interval 104, lines 50 and 60 go low causing devices 12, 14, and 18 to enter in a low power state and line 30A to return to HOLD state 112. Thereafter, intervals 106, 108 and 110 correspond to intervals 100, 102, and 104 respectively. Thus FIG. 2 shows switching portions of the receiver ON and OFF to reduce power while passing signal when the receiver is ON and stable and holding a voltage when portions of the receiver are either OFF or during start-up transients.

Figure 3:
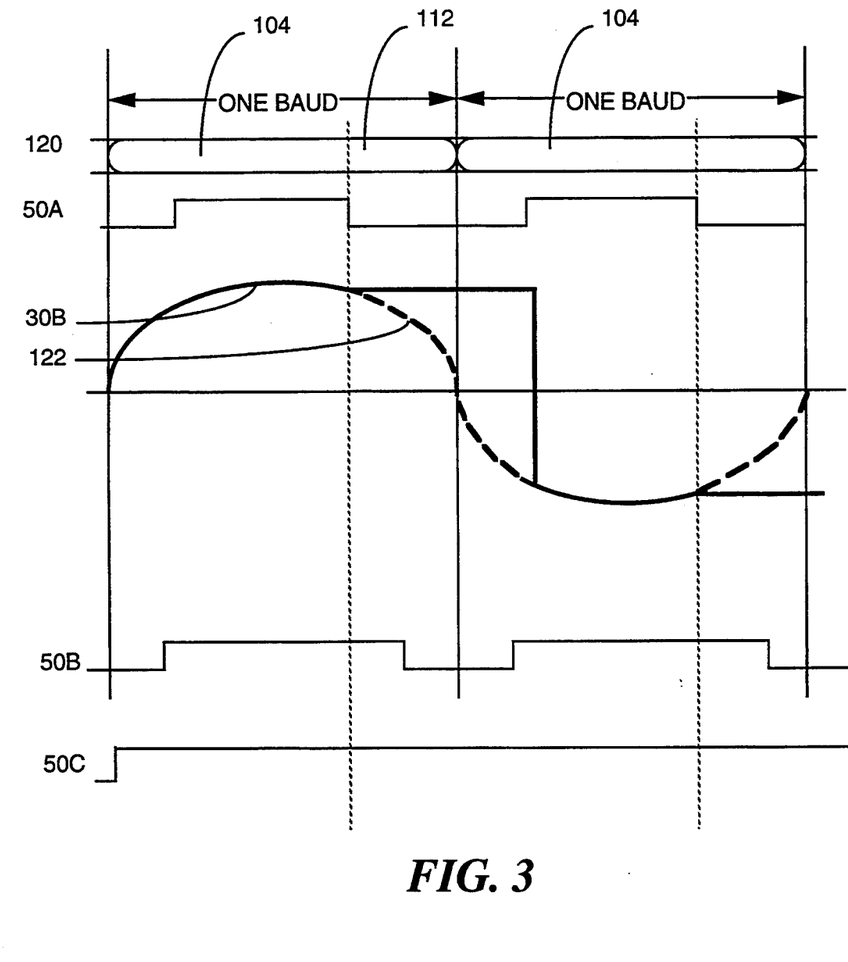
FIG. 3 diagrams the battery saving strobes operating in accordance with the preferred embodiment of the present invention, and resulting received information.

FIG. 3 diagrams the battery saving strobes operating in accordance with the present invention, and resulting received information. Line 120 represents an eye pattern of transmitted binary data, and line 30B represents an analog equivalent of a received binary "one" followed by a binary "zero" on node 30. The clear areas of lines 120 and 30B represent the SIGNAL state 104 of FIG. 2, while the shaded areas represents the HOLD state 112 of FIG. 2. Line 50A represents the battery saver strobe under relatively strong signal conditions. During SIGNAL intervals 104, line 30B relatively approximates the positive and negative cycles of the "one" and "zero" transmission. However during HOLD interval 112, devices 12, 14, and 18 are off and thus conserving power. Line 30B remains holding the voltage present when entering the HOLD state, even though the transmitted signal is changing as shown by dashed line 122. When the SIGNAL state 104 is again entered, line 30B rapidly converges upon the transmitted signal. Before the signal is processed by decoder 40, filter 32 will be able to filter out some of the distortion in the signal introduced during the HOLD state 112. If the energy of the received signal is sufficiently greater than the received noise and distortion introduced by the battery saving mode of this invention, the information will be properly processed and receiver current drain will be reduced.

Line 50B represents the operation of the battery saver under conditions having less signal strength. In such a situation, signal quality detector 42 may have determined that operating HOLD mode for the length of time as shown by line 50A introduced too much noise and distortion into the signal and thus the duty cycle of the battery saver strobe was reduced thereby reducing distortion and increasing the signal quality. The quality improvement is at the expense of additional power consumption by devices 12, 14, and 18. Finally, line 50C represents a receiver operating in poor received signal conditions wherein the battery saving features of this invention are substantially inhibited.

Lines 50A, 50B and 50C are shown synchronized to the eye pattern of line 120. This is accomplished by coupling duty cycle modulator 44 to bit synchronizer 46. In the preferred embodiment, bit synchronizer 46 is driven by a reference clock of either 16 or 32 times the data rate. Using a method well known to those familiar with the art, a center sample clock from the reference clock is established to sample the bit. In one embodiment battery saving would begin substantially immediately after sampling of the bit. Duty cycle modulator 44 would continue the battery save interval for a number of reference clock cycles, the number being determined in response to the signal quality detector. In alternate embodiments the battery saving strobe may be synchronized symmetrically around the expected occurrence of the edge.

The method of FIG. 3 has the advantage of only introducing one stabilization cycle 102 per bit, where high power is consumed but the signal is not stabilized. Note that a 1200 baud signal has a bandwidth of substantially 600 Hz. This invention shows switching portions of the receiver ON and OFF 1200 times per second, which is approximately two times the bandwidth of the information received.

Figure 4:
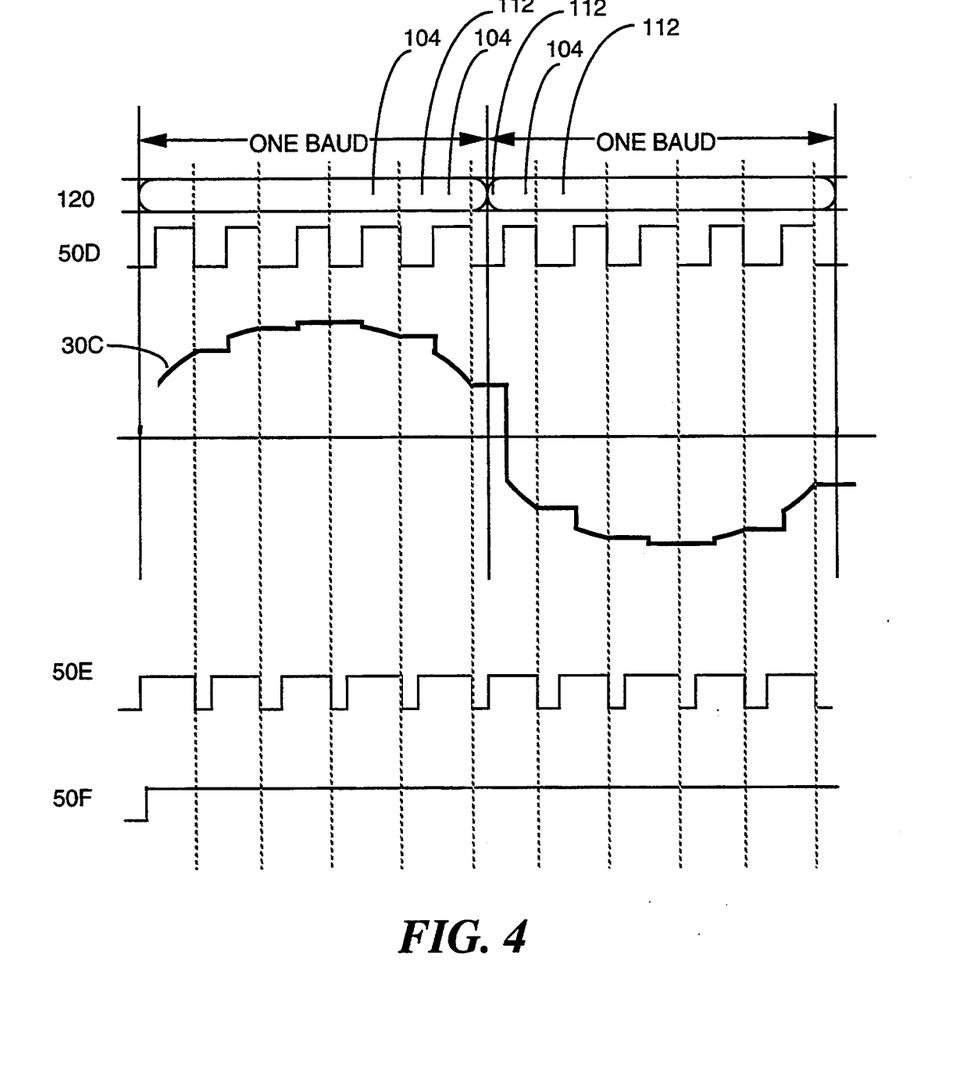
FIG. 4 diagrams the battery saving strobes operating in accordance with an alternate embodiment of the present invention, and the resulting received information.

FIG. 4 diagrams the battery saving strobes operating in accordance with an alternate embodiment of the present invention, and the resulting received information. Line 120 represents an eye pattern of transmitted binary data, and line 30C represents an analog equivalent of a received binary "one" followed by a binary "zero" on node 30. The clear areas of lines 120 and 30C represent the SIGNAL state 104 of FIG. 2, while the shaded areas represent the HOLD state 112 of FIG. 2. Line 50D represents the battery saver strobe under relatively strong signal conditions. During SIGNAL intervals 104, line 30C relatively approximates the positive and negative cycles of the "one" and "zero" transmission. However during HOLD interval 112, devices 12, 14, and 18 are off and thus conserving power, line 30C remains holding the voltage present when entering the HOLD state, even though the transmitted signal is changing. When the SIGNAL state is again entered, line 30C rapidly converges upon the transmitted signal.

In FIG. 4, the switching between high and low power states occurs at a rate substantially greater than the baud rate. As can be observed by the differences between line 30B and 30C, the distortion introduced in the method of FIG. 4 is substantially less than the distortion of FIG. 3 because shorter HOLD intervals in line 30C results in a signal which more closely approximates the transmitted signal. Furthermore, in a preferred embodiment where the battery saving switching rate is approximately 32,000 times per second, the more rapid transients in the signal introduced by the HOLD state will be filtered both by the 25 kHz bandwidth of IF filter 20, as well as filter 32 before the signal is processed.

Line 50E represents the operation of the battery saver under conditions having less signal strength. In such a situation signal quality detector 42 may have determined that operating the HOLD mode for the length of time as shown by line 50D introduced too much distortion into the signal and thus the duty cycle of the battery saver strobe had to be reduced to insure a sufficient quality signal, at the expense of additional power consumption by devices 12, 14, and 18. Finally, line 50F represents a receiver operating at very poor received signal conditions wherein the battery saving features of this invention are substantially defeated.

Lines 50D, 50E and 50F are not necessarily synchronized to eye pattern 120. This allows for battery savings upon all types of information including tone and voice signalling systems. For example, line 30C could alternately represent one cycle of a sine wave representing a signalling tone or a voice message. Also, the faster rate of the switching reduces the magnitude of the distortion in signal 30C (relative to signal 30B) thereby making the introduced distortions easier to filter out. Both filters 20 and 32 may perform some of the filtering. This method reduces the sophistication by requiring no synchronization to the received information, but introduces multiple stabilization cycles 102 within a bit.

Figure 5:
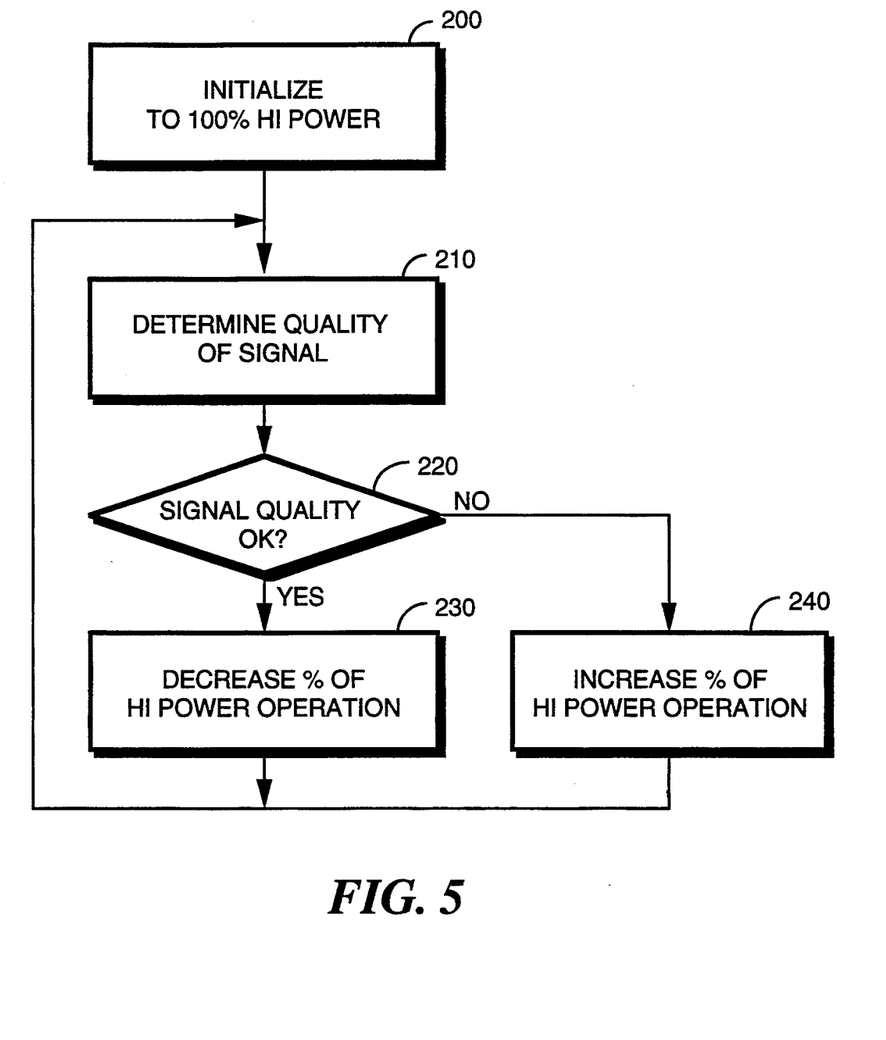
FIG. 5 shows a flowchart of the control of the battery saver in accordance with the preferred embodiment of the present invention.

FIG. 5 shows a flowchart of the control of the battery saver of the present invention. First, in step 200, the battery saver is initialized to 100% high power mode. During this stage, normal synchronization to the paging signal may be performed. Step 210 determines the quality of the signal. If a high quality signal is determined, then step 230 decreases the percent of high power operation, preferably by $\frac{1}{8}$ of a bit time. Otherwise, step 240 increases the percent of high power operation, preferably by $\frac{1}{8}$ of a bit time, up to a maximum of 100%. Then either steps 230 or 240 return to step 210 to begin again the adjusting of high power operational. While step 210 and its subsequent steps are preferably performed continuously, they may alternately be performed periodically. In one embodiment, the battery saver of the invention is active only after a pager has determined a message for the pager is being transmitted. In other embodiments, where the pager is searching for its address, the percent of high power operation may be adjusted each time the pager searches for an address or synchronization word, such as during a POCSAG sync code or frame associated with a pager. Furthermore, in an alternate embodiment, the entire receiver may be switched between high and low power states, the invention not being limited to only portions of the receiver.

We claim:

1. A method of conserving power in a receiver receiving information having a bandwidth and which is modulated upon a carrier, and wherein the receiver includes demodulating means for demodulating the received information from the carrier and filter means coupled to the demodulating means, the filter means having a bandwidth substantially equal to the bandwidth of the information, the method comprising the steps of:

switching at least a portion of the receiver between a high and a low power state such that during the high power state, said portion of the receiver necessary for receiving the information is supplied power, and during the low power state, said portion of the receiver necessary for receiving the information is not supplied power, said switching occurring at a rate greater than the bandwidth of the information;

disabling the coupling between the demodulating means and the filter means in response to switching the receiver to the low power state.

2. The method according to claim 1 further comprising the steps of:

determining the quality of the received information; and adjusting the durations of the high and low power states in said step of switching, said step of adjusting being in response to the quality of the received information.

3. The method of claim 2 wherein said step of switching introduces distortion into the received signal, and said step of determining also determines the quality of the received information with the distortion introduced by said step of switching.

4. The method according to claim 1 wherein said step of disabling further includes the step of holding the magnitude of the signal received by the filter means substantially constant during said step of disabling.

5. The method according to claim 1 wherein the information includes digital information contained within symbols occurring at a predetermined baud rate wherein said step of switching switches between said high and low power states a plurality of times during each symbol.

6. A method of conserving power in a receiver receiving information having a bandwidth, wherein the information includes digital information contained within symbols occurring at a predetermined baud rate, the method comprising the steps of:

determining a time between consecutive symbols and a substantial center of each symbol;

synchronizing to the symbols;

switching the receiver into a low power state substantially during the time between symbols; and switching the receiver into a high power state substantially in the center of each symbol.

7. A method of conserving power in a receiver receiving a radio frequency signal having digital information contained within symbols, the method comprising the steps of:

operating the receiver in a high power mode in order to receive and process the radio frequency signal for a first portion of a symbol;

operating at least a portion of the receiver in a low power mode for a second portion of the symbol, the low power mode rendering reception of the radio frequency signal substantially inoperative during the second portion of the symbol, wherein the radio frequency signal may be received with noise and the low power mode introduces distortion into the symbol;

determining an amount of noise and distortion in said symbol to be greater than a predetermined threshold; and increasing a duration of the high power mode in a symbol subsequent to said symbol in response to said step of determining.

8. A method of conserving power in a receiver receiving a radio frequency signal having digital information contained within symbols, the method comprising the steps of:

operating the receiver in a high power mode in order to receive and process the radio frequency signal for a first portion of a symbol;

operating at least a portion of the receiver in a low power mode for a second portion of the symbol, the low power mode rendering reception of the radio frequency signal substantially inoperative during the second portion of the symbol, wherein the radio frequency signal may be received with noise and the low power mode introduces distortion into the symbol;

determining an amount of noise and distortion in said symbol to be less than a predetermined threshold; and increasing a duration of the low power mode in a symbol subsequent to said symbol in response to said step of determining.

9. An apparatus for processing information having a bandwidth and being modulated upon a carrier signal, said apparatus comprising:

receiving means for receiving the carrier signal and demodulating the information while in a high power state; and power conservation means coupled to said receiving means for switching at least a portion of said receiving means between the high power state and a lower power state such that during the high power state, said portion of the receiver necessary for receiving the information is supplied power, and during the low power state, said portion of the receiver necessary for receiving the information is not supplied power, the switching occurring at a rate greater than the bandwidth of the information;

the receiving means comprising:

demodulating means for demodulating the information from the carrier signal;

filter means coupled to said demodulating means for filtering the demodulated information; and transmission means for decoupling said demodulating means from said filter means in response to said receiving means being switched to the low power state.

10. The apparatus of claim 9 wherein the carrier signal is a radio frequency signal, and said receiving means further includes:

mixing means for converting the radio frequency signal into an intermediate frequency signal; and wherein said power conservation means substantially reduces the power consumption of said mixing means so as to render said mixing means inoperative in the low power state, thereby rendering said receiving means incapable of receiving the carrier signal while in the low power state.

11. The apparatus of claim 9 further wherein:

said receiving generates transients when switching from the low power state to the high power state; and said transmission means inhibits the coupling between said demodulating means and said filter means while said receiving means generates the transients.

12. The method apparatus according to claim 9 further comprising:

storage means coupled to said filter means and said transmission means for holding the signal received by the filter means substantially constant while the coupling between said demodulating means and said filter means is disabled.

13. An apparatus for processing information having a bandwidth and being modulated upon a carrier signal, wherein the information includes digital symbols occurring at a predetermined baud rate, said apparatus comprising:

receiving means for receiving the carrier signal and demodulating the information while in a high power state;

synchronizing means coupled to the receiving means for synchronizing to the digital symbols and for determining a substantial center of each symbol;

a signal quality detector coupled to the receiving means for determining noise and distortion included with the information; and power conservation means coupled to said receiving means, said signal quality detector and said synchronizing means, said power conservation means for switching at least a portion of said receiving means between the high power state and a low power state, the low power state in which a portion of the receiving means necessary for receiving the carrier signal is disabled, the power conservation means switching between the high power state and the low power state at a rate greater than the bandwidth of the information, wherein the carrier signal may be received with noise and the low power state may introduce distortion into the information, wherein said power conservation means adjusts a duration of the high power state and low power state in response to said signal quality detector, and wherein said power conservation means is responsive to said synchronizing means to operate the receiving means in the high power state during the substantial center of each symbol and to operate the receiving means in the low power state during times exclusive of the substantial center of each symbol.

14. The apparatus of claim 13 wherein said receiving means further comprises:

amplifying means from amplifying the carrier signal; and wherein said power conservation means reduces the power consumption of said amplifying means in the low power state.

* * * * *